United States Patent [19]

Smith

[11] 4,244,998
[45] Jan. 13, 1981

[54] PATTERNED LAYERS INCLUDING MAGNETIZABLE MATERIAL

[75] Inventor: Andrew L. Smith, London, England

[73] Assignee: E M I Limited, Hayes, England

[21] Appl. No.: 856,135

[22] Filed: Nov. 30, 1977

[30] Foreign Application Priority Data

Dec. 6, 1976 [GB] United Kingdom ............... 50846/76
Jul. 21, 1977 [GB] United Kingdom ............... 30720/77

[51] Int. Cl.² .............................................. B32B 7/02
[52] U.S. Cl. .................................... 428/195; 428/212; 428/900
[58] Field of Search .............................. 427/127–132, 427/47, 48; 428/900, 195, 212

[56] References Cited

U.S. PATENT DOCUMENTS

| 2,975,754 | 3/1961 | Wright ................................. 118/407 |
| 3,111,422 | 11/1963 | Newman et al. ....................... 427/47 |
| 4,075,384 | 2/1978 | Suzuki et al. ..................... 427/131 X |
| 4,081,132 | 3/1978 | Pearce ............................... 427/48 X |

FOREIGN PATENT DOCUMENTS 1273382  5/1972  United Kingdom .
1331604  9/1973  United Kingdom .
1334141 10/1973  United Kingdom .

*Primary Examiner*—Bernard D. Pianalto
*Attorney, Agent, or Firm*—Fleit & Jacobson

[57] ABSTRACT

A layer including magnetizable material and a pigment of lower magnetic susceptibility in a settable coat are subjected to a selectively applied magnetic field gradient in the layer while the coat is unset to cause the magnetizable material to selectively break through the pigment. The coat is then set, while the materials remain in position, to produce a detectable pigmentation pattern of said break-through. The magnetic material may itself be a pigment and break-through the first one to produce an eye-visible pattern. The magnetizable material forms a magnetic susceptibility distribution pattern equivalent to the pigment break-through pattern.

The layer having the pigment pattern may be used as a security feature in, e.g. a security document, both the patterns being alterable, once the coating has set, only by damage to the layer.

9 Claims, 6 Drawing Figures

PATTERNED LAYERS INCLUDING MAGNETIZABLE MATERIAL

This invention relates to a material layer having a detectably patterned surface and especially but not exclusively to such layers including magnetisable material for use as security materials.

U.K. PS No. 1331604 describes a technique for producing a permanently structured magnetic layer in which acicular particles of gamma iron oxide in a thermosetting binder have their easy axis of magnetisation aligned in one direction in specific areas of the layer. This permanent structure in the layer can produce a corresponding structure of a texture variation in the surface of the layer. However this texture variation is not always easily visible, if visible at all.

It is an object of the invention to provide a layer with a detectably patterned surface.

According to the invention there is provided a method of making a material layer having a detectably patterned surface including:

providing two settable coatings each including respective coating material distinct from the material of the other coating in magnetic susceptibility and pigmentation, at least the material of higher susceptibility being a magnetisable material, applying one of said coatings as a continuous coat on a support and applying the other coating as a continuous coat over the one to produce a two-coat layer with the continuous coatings distinct, exerting at selected parts of the coatings a magnetic field having a gradient in the layer to influence the coating material of higher susceptibility in distinction from the material of lower susceptibility to break through the coat including the material of lower susceptibility to the remote surface thereof at said selected parts to produce a detectable pattern of the pigmentation of the coats at said remote surface, and thereafter causing or allowing the coatings to set to fix the pigment and magnetisable material of the coatings in position in the layer, thereby forming said detectable pattern.

The magnetisable material may be in the form of magnetically anisotropic particles and the selective action of the field may cause an easy axis of magnetisation of individual particles to align or not align as a particular pattern of alignments coinciding with the pigment pattern.

The distinct pigmentation may be different opacity, colour or emission spectrum when light or other radiation is incident thereon. The difference in colour or opacity may be visible to the unaided eye when the pigment is illuminated by visible light or other radiation.

The field may be pulsed magnetic field through which a web supporting the unset coatings is moved.

The susceptability of each material may in the same sense, ie both positive, or in opposite sense, eg one positive one negative. Once coating material, of lower susceptibility, may be diamagnetic or paramagnetic and the material of higher susceptibility may be ferromagnetic.

According to the invention there is also provided a security document including on a support a layer formed by two overlaid coatings of differently pigmented materials of different magentic susceptability, the coating including the material of higher susceptability breaking through the other coating to an outward surface thereof and at distinct positions to form a pattern of the pigments one against the other, the material of higher susceptability also having a pattern of concentration in a layer region adjacent said outward surface corresponding to said pattern of pigments.

The pigments may be visibly distinct to the unaided eye.

According to the invention there is also provided a security document system of at least one security document including a security element of a layer of materials patterned at an outward surface with a pigmentation pattern and including a corresponding magnetic susceptibility pattern and at least one examining apparatus to permit an operation of the system in response to a presented genuine document, the apparatus including means to determine the authenticity of at least the magnetic susceptability pattern of a presented document before permitting such an operation.

Embodiments of the invention will now be described with reference to the accompanying drawings in which.

Figure 1:
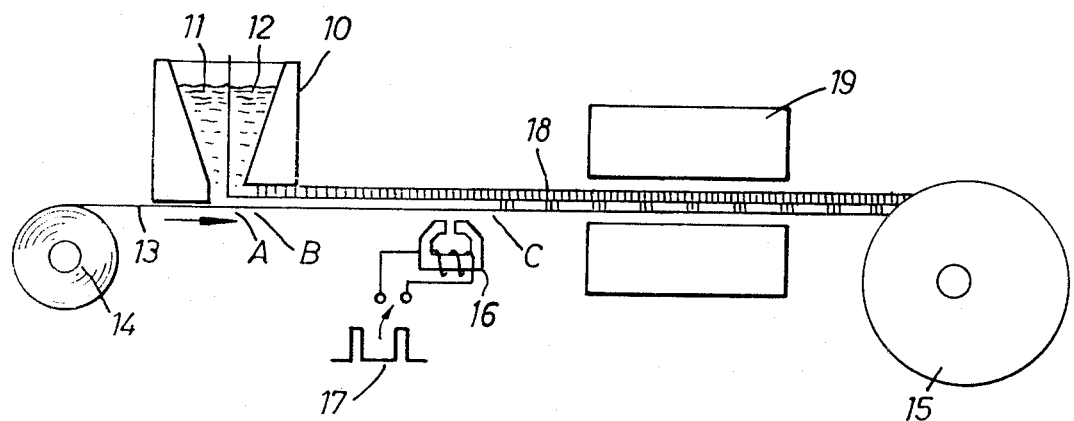
FIG. 1 shows a coating apparatus.

In FIG. 1 a split coating trough 10 supplies two thermally settable coating materials 11, 12 for application as separate coats on a web of transparent support material 13, such as a polyester plastics, supplied from roll 14 and taken up, after coating in a manner to be described, on reel 15. The coating materials may be dispersions in a binder. The separate coats are distinctly coloured, one white, one black. The white pigment is non-magnetic and the black one (12) is a magnetisable material in particle form e.g. chromium dioxide. A recording head 16 is operated by a pulse waveform 17 as shown to produce a magnetic field gradient in the thickness of the coatings to cause the mobile magnetic, black, coat 12 to migrate through the white non-magnetic coat where the pulses act on it. The effect of this is indicated by the marks such as 18. The coatings are set by heat in oven 19, the remanent magnetisation of the magnetisable particles keeping them in position to ensure the set coatings have the pattern caused by the migrating particles. The dried coating web is taken up on reel 15. The method just outlined produces a web having a coating including two-colour pattern and a coincident magnetic material pattern on the web-adjoining surface.

Figure 2:
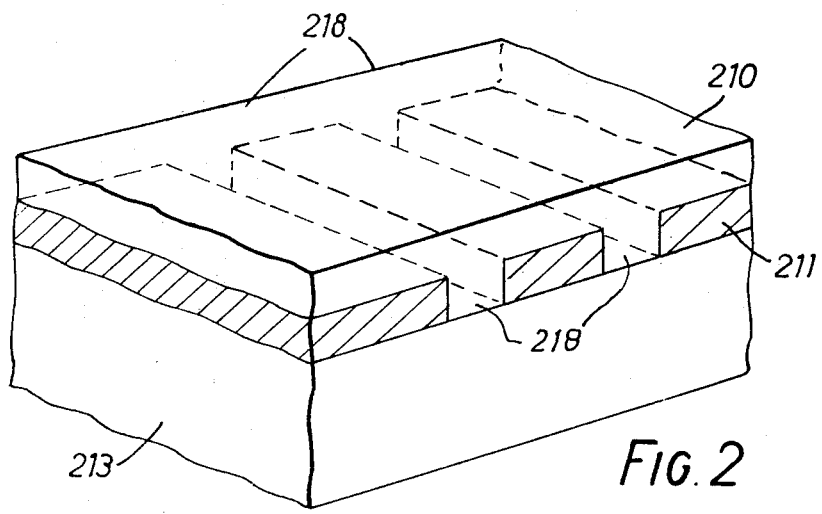
FIG. 2 shows a portion of security material having a visibly patterned surface.

FIG. 2 shows a portion of the coated web e.g. after slitting in known manner. The transparent web 213 has adjacent thereto a surface pattern of the white coat 211 penetrated by the black coat 210 where the pulsed field existed to show black bars 218. (For convenience the white coat only is indicated by shading.) The black bars also include the magnetisable material so a magnetic pattern is also present adjacent web 213. The presence of a visible pattern fixed by the setting, together with the related fixed pattern of magnetisable material, provides a security feature in that the patterns are detectable for checking of their form and the form is secured by the setting of the binder in which the materials are dispersed.

If desired the pulsed magnetic field can be directed to align the easy axis of magnetisation of anisotropically magnetisable particles to form a pattern of magnetic structure while forming the visible pattern. Such techniques are described for acicular particles in U.K. PS No. 1331604. Even without such alignment the remanence at the surface of coat 211 will vary with the variation of the concentration of the material of coat 210 at this surface.

Figure 3A:
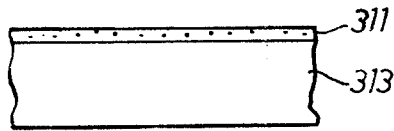
FIG. 3 shows stages in the production of a security material.
Figure 3B:
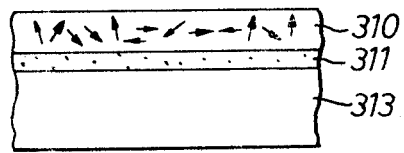
Figure 3C:
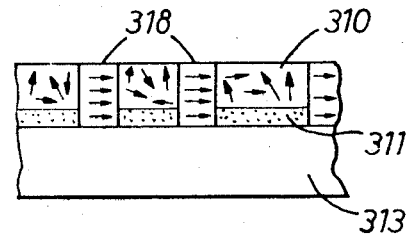

The formation of a security material in this way is shown at FIG. 3 with the magnetic particles indicated conventionally by arrows. FIGS. 3a, 3b and 3c show the material at points A, B and C of FIG. 1 respectively.

Various specific coatings are now described in more detail. It is to be noted that the apparatus applying the coating can be one of several well-known in the art for applying distinct coatings of wet materials one on top of the other without appreciable merging.

EXAMPLE A

Colour Dispersion AC—76% Dry loading (w/w) of a commercial $TiO_2$ pigment in a lacquer of a modified PVC/PVAc copolymer, polyester resin, minor additives in a ketone/toluene solvent mixture. (Ball milled)

Magnetic Dispersion AM—76% Dry loading (w/w) of a Chromium Dioxide material in a polyvinylidene chloride/polyacrylonitrile co-polymer, polyurethane resin, minor additives (incl. surfactants) in ketone solvent, lacquer. (Ball milled)

By addition of solvent the dispersions are reduced to suitable viscosities for the coating technique (e.g. trough). Dispersion AC is applied to a polyester film substrate so as to give a film of 3 microns dried thickness. To this still-wet film dispersion AM is applied to give a film of 10 micron dried thickness. The still-wet two-layer coating formed by the films is passed over a magnetic record head, which is driven by a square shaped current pulse at a rate corresponding to (say) 75 phase changes per inch of coating. The processed coating is then dried.

The resulting dried coating shows the impression of the phase changes in terms of a breakthrough of the second (black) coating through the first (white) film to the surface of the polyester film (and, under suitable conditions, the reciprocal breakthrough of the first of the surface of the second) thus allowing visual determination of the magnetic patterns applied to the coatings from one or both sides as appropriate. In this example the pigment ad magnetisable material are the same in one coating ie black chromium dioxide.

Referring to FIG. 3 dispersion AC would form coating 311 on the polyester base 313 while dispersion AM forms coating 310 on coating 311. Regions 318, which are both magnetically and visibly distinct, are formed by the pulsating magnetic field and contain aligned magnetic particles while the coating 310 contains unaligned particles, which may have already been aligned by a cross-wire field (FIG. 3c).

Figure 4:
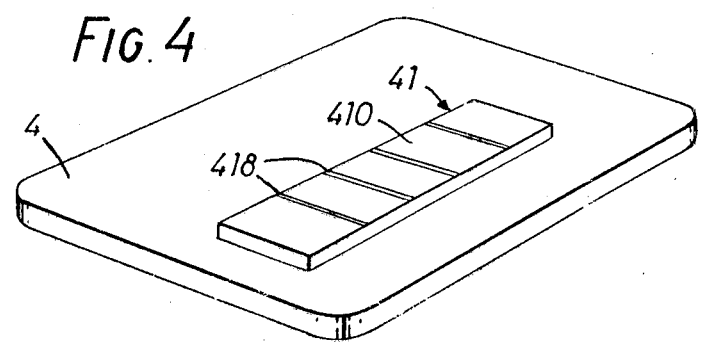
FIG. 4 shows a security document in the form of a pass-card bearing security material.

FIG. 4 shows a security document in the form of a pass-card 4 carrying a security element 41 of security material of a strip of material such as is shown in FIG. 3. The material is attached with the transparent web uppermost (if present). The bars 418 of the coating nearest to card 4, which are visibly distinct from and break through the coating 410, are also magnetically distinct in that when magnetised along the direction of the easy axis of magnetisation the bars have a higher remanence than the remainder of the element 41.

The techniques described are useful for distinguishing the binary states of many conventional low density magnetic codes currently employed in magnetically structured coatings. The techniques may also be used to form visible alphanumeric patterns by means of multi-track or matrix recording heads.

The selection of materials for the coatings is now discussed with reference to further examples.

Considering that an important characteristic of the effect is the miscibility of the two coatings, it is important to distinguish between those cases in which the vehicles of the respective layers are broadly similar to nature from those where the binder-solvent characteristics are widely different. It is to be expected in the latter situation that the coating break through would be more pronounced, while at the same time there is a danger that there would be a gross disruption of the remote surface of the coating, and a possible deterioration in the cohesive qualities of the dried coatings on layer.

Identical binder systems may be used for each component, i.e. for each coat, and such components are clearly compatible. However, it has been found that by using chemically dissimilar, but still compatible systems, improvements can be obtained. If the systems, either binder or solvent parts, are greatly different, problems may occur where the coats are in contact or mixed. Such problems are inadequate wetting, intercoat adhesion, gelling of one of the coatings, all of which impair the finished product.

Accordingly, all solvents should be solvents, co-solvents or diluents for *both* systems. Thus one suitable set of systems may be based on vinylidene/polyurethane in ketones with vinyl chloride/acetate copolymers in hydrocarbon/ketone solvents. Another suitable set is vinyl chloride copolymers in hydrocarbon/ketone solvents with thermoplastic acrylic resins in toluene. Other suitable sets of systems will now be apparent to those skilled in the art, having regard to the requirements set out. In general, either system may be used for the colour pigment or the magnetic pigment, but as the systems have different properties, the one appropriate to the end use may be selected. Thus if one system has better lamination or transfer properties, this may be used for the appropriate coat of the layer and either pigment introduced as required. It has been found that, in general, the pigment should be between 55% and 80% of the dried solids proportion of the non-magnetic layer, and between 73% and 81% for the magnetic layer. This will ensure adequate opacity, colour strength, magnetic signal and layer durability. Clearly, if these requirements can be relaxed, the proportions can be widened substantially, say 10 percentage points.

Considering the colour pigment coating this should have as low a viscosity as practical while remaining stable. A solids content which produces a dispersion with an apparent viscosity between 15 and 40 centipoises is satisfactory and a low solids content also ensures that the colour coat is thin; both when wet and when dry. The solvent of the system should have a low surface tension, subject to the above requirements. As common magnetic materials are black or brown, the colour pigment should have a high contrast with such a colour and also a high optical opacity to ensure good colour rendering against the underlying dark material. Suitable materials are titanium dioxide, lead chromate, lead molybdate and diarylide yellows and oranges. Fluorescent pigments provide high contrast but have low opacity. The use of magnetic pigments, e.g. alpha or gamma iron oxide for the colour pigment, with chromium dioxide in the magnetic pigment, did not produce a detectable surface pattern when treated as described in Example A. Thus it appears desirable that the colour pigment should be non-magnetic, or at least not highly paramagnetic.

All substances have a magnetic susceptability although the range of values is wide, from $+10^6$ to $-10^{-5}$, and many materials are considered to be non-magnetic. Some pigments are strongly paramagentic eg red oxide, yellow ochre and emerald green, while others are strongly diamagnetic eg bismuth metal and compounds of lead (white pigment) mercury (red) cadmium (yellow). When a magnetic field gradient is applied in the thickness of a mobile coating material will move up the field gradient if paramagnetic (or ferromagntic) and down the gradient if diamagnetic. While rheological considerations are important in the mobility of material in the coatings the effect of diamegentism should not be ignored, although, as will be apparent from the values below the effect may be much smaller.

Susceptibility (in Cgs units)

Paramagnetic materials

| red iron oxide | $+4,000 \times 10^{-6}$ |
|---|---|
| emerald green ($Cr_2O_3$) | $+2,000 \times 10^{-6}$ |
| titanium dioxide | $+6 \times 10^{-6}$ |

Diamagnetic materials

| hydrated aluminum sulphate | $-320 \times 10^{-6}$ |
|---|---|
| bismuth metal | $-280 \times 10^{-6}$ |
| hydrated zinc sulphate | $-150 \times 10^{-6}$ |
| mercuric oxide (red) | $-44 \times 10^{-6}$ |
| cadmium oxide | $-30 \times 10^{-6}$ |

Magnetic tape materials

No exact values can be given for these ferro and ferri magnetic materials as these vary with the applied field. However typical values are around unity (cgs unit) that is some three orders of magnitude greater than for para and dia-magnetic materials. Tape materials include gamma iron oxide ($Fe_2O_3$), chromium dioxide metal powders, ferrites and metal doped oxides. (The above values are derived from CRC Handbook of Chemistry and Physics, 53rd edition, 1972-73).

Considering the magnetisable pigment coating, this also should have a low viscosity but not quite as low, e.g. 25-50 c.p., as the colour pigment coating. To provide a suface suitable for contact magnetic reading, a flow agent (e.g. the proprietary material Modaflow) may be added. As mentioned above, the colour contrast of the materials is significant. Black magnetisable pigments, e.g. chromium dioxide ($CrO_2$) or magnetite ($Fe_3O_4$) are good, but brown iron oxide (y $Fe_2O_3$) is also suitable with a white colour pigment. Clearly, other magnetisable materials may be used, e.g. iron powder, ferrites, when properly dispersed. A mass susceptibility in excess of 0.05 (cgs units) is preferably for the higher susceptibility, magnetisable coating material.

It is possible to produce a complete interchange of coatings, so that both sides of the layer exhibit an alteration in colour, but, to achieve this, coatings have to be only poorly compatible so that the coatings are not in a stable condition before the magnetic field is applied. The magnetic performance of such a layer is poor and the appearance of the viewable pattern poor. Such a layer is thus really only suitable for low density coading, such as bar codes.

Where the coatings are compatible, as described above, limitations on information density still exist. A range of between 40 and 70 flux changes per inch along the layer has been attained. The large gap width needed for the recording head and the lack of viewable clarity, i.e. selectivity, cause the upper limit. The lower limit is probably due to difficulty of physically moving the material quantity involved in continuing colour inversion region. The web speed at which the coding is applied is also important. A slower speed is desirable to maintain sharp edges to the parts of altered pigmentation. Speeds of 0.05 m/sec are usuable but better quality, especially of alphanumeric matrix coding, is obtained at a speed down to 0.02 m/sec. The stray magnetic fields from the high current in the head also affect the action. For alphanumeric characters a dot matrix pattern rather than a continuous character is preferable. When the head current is high the magnetic characters are also poorly formed, the vertical component of the head field at the edges of the gap degrading the action of the horizontal component in the middle of the gap.

Exemplary systems are now described. In general, these may be interchanged as described above, although the additives may not also be suitable. The examples are on a weight basis.

EXAMPLE B

Magnetic Dispersion BM 74-79%, dry loading, of magnetic material in a lacquer containing polyvinylidene chloride/acrylonitrile (low viscosity grade) copolymer, with a non-reactive polyurethane elastomer and minor additives, e.g. surfactants and flow modifiers, in a ketone solvent mixture. The pigment is dispersed using a ball mill and solvent added to produce the required viscosity.

Coloured Dispersion BC; a solids loading of 55 to 78% in a binder of hydrolysed vinylchloride-acetate copolymer with little or no additions, using a ketone/toluene solvent mixture to produce the required viscosity was attained by dispersing pigment by ball milling or high-shear stirring. Pigments are as follows:
(a) a range or coated and uncoated samples of commercial titanium dioxide (white) produced by Tioxide Ltd.,
(b) yellow lead chromes such as Hercules X2541 and Horna GL35,
(c) orange lead molybdate such as Hercules X2552,
(d) high opacity organic yellow such as diarylide yellow, Horna BTK52 or BT49,
(e) a permanent yellow, Hoechst (UK) Ltd. HR70.

Extenders can replace up to at least 40% of the $TiO_2$ provided the rheology (flow characteristic) is not altered significantly. Suitable extenders are uncoated calcium carbonate (Sturge-Sturcal F), coated calcium carbonate (Sturge-Calofil A4) and dolomite (Norwegian Talc-Microdol/Super).

Dispersion BC could be altered, while still usable with dispersion BM, by replacing the resin binder with an ethyl methacrylate copolymer in a hydrocarbon solvent and dispersing Tioxide R-TC2 at 60% in a ball mill or high speed dissolver.

Dispersion BM could be altered by using a copolymer of methyl methacrylate with ethyl methacrylate or copolymer of partially hydrolysed vinyl chloride/vinyl acetate. The solvents would be toluene or ketone/toluene with the same additives as above.

The materials described above are used as described in Example A to make a material layer having a detectably patterned surface by the action of magnetic fields on the coatings of wet material. As explained above, the direction of the magnetic field can be chosen having regard to the alignment required. Thus a field may be applied in the plane of the coatings to orient magnetisable particles without producing a vertical component leading to migration of the coating. It has also been noted that wide-gap metal heads are most effective in producing the patterned surface. Such heads have larg fields with high vertical components, i.e. perpendicular to the coating plane. It is essential that stray fields be reduced to avoid any degradation in the optical appearance of the pattern. The head is positioned below the substrate on which the coatings are laid.

A typical head is made from mu-metal pole pieces and a ferrite body linking the pole pieces. The gap is usually between 3 and 10 thousandths of an inch. In one embodiment of the invention in which alpha-numeric forms were produced in a 7×5 dot matrix format a conventional 7 track instrumentation head with a gap widened to the above range and selectively energised on each winding at 50 to 100 mA, was used.

The details given in the examples will permit those skilled in the art to formulate suitable materials from the guidelines furnished. The proportions are also easily determined by such skilled persons. A particular point to note is that ferro- and ferri-magnetic materials can be present in small amounts in the para- and dia-magnetic materials for the lower susceptability coating material. Even a small amount can impair the process as their susceptability is relatively so high.

The security material produced as described above or by similar techniques may be used in a security document in various ways. As shown in FIG. 4 a patterned layer is attached to a plastics card which may be of the conventional bank card format, and which may carry other magnetic or printed data. The layer may be attached by hot-blocking or like thermal bonding or transfer methods. The substrate or web on which the layer has been prepared may be left in place as an outermost protective coating if desired. Apparatus for examining security documents in which the security feature is provided by magnetisable material disposed in a pattern is now well-known. One example is shown in U.S. Pat. No. 4,038,596 but clearly other suitable types may be used. Also a cross-check may be carried out using apparatus which examines the pigmentation pattern, e.g. in the manner of a bar-code reader, and provides an appropriate signal for comparison with a signal derived from the magnetic examination apparatus.

In applications where unaided visual detection is undesirable or not required the techniques described above are useful as a means of providing an additional security level of dual read capability. This might be achieved for example by the substitution of a transparent, ultra-violet sensitive fluorescer for the non-magnetic pigment. Application of a magnetic field to the wet dual layer coatings as described above would produce a material in which, under ultra-violet radiation, those areas which had been affected by the break through of the (opaque) magnetic material would not fluoresce as strongly as the unaffected areas.

A further possibility in those cases where the separate application of two layers is not desired is to incorporate a sensitive material throughout the pigmented layer; after any process (excluding the final magnetic write) which might disturb the structure of the coating, the sensitive material is sensitised (by radiation etc.) at one layer surface only. The sensitised material should contrast in some way from the unsensitised, for example a photographic emulsion. Selective application of a magnetic field can disturb the thin surface layer of sensitised sensitive material to cause its replacement at selected points by break through of unsensitised material from within the bulk of the coating, in a manner analoguous to that described above for separately applied coats.

The techniques are also relevant to three (or more) coatings to promote specific reactions in selected portions of a multicoat medium by the application of a magnetic field. Thus if a coating, A, reacts with a coating, B, to produce substance C, coating A is coated first (as a dispersion), followed by a magnetic layer, followed by a dispersion of B. The magnetic layer is acted on to produce local turbulence and thus mixing of material of coating A across the interface of the magnetic layer within material of coating B. Thereby A will react with B, forming C, only in those portions where the two materials A and B have been brought into contact by the selective application of a magnetic field.

The selective initiation of the reaction along the coated medium can be used in various ways. The reaction product may itself produce the distinct pattern, correlated with the pattern of magnetic material displacement bringing about the reaction, thereby providing a security material. The reaction product may be removable e.g. by selective solubility, again leaving a pattern, or may react further, with the magnetic material, to fix the pattern in place. The pattern may be based on a matrix and represent symbols, shapes, alphanumeric characters and graphic forms.

In another embodiment three layers of material are deposited as follows. Materials such as A and B just referred to are placed in overlaid coats on a support web. The coats may be separated by an inert material if necessary. A magnetisable material coat is placed over the overlaid coats. By selective field application reaction of A and B, producing C, can be brought about by the magnetisable material moving in the field gradient to bring A and B into contact.

The examples described above have been based on resin systems which set on becoming dry by evaporation of solvent. Such systems become soft or fluent when solvent is again applied. Modification of the structure is thus theoretically possible. However the compound action of moving pigment and magnetisable material to form the structure makes any manipulation after drying and resoftening most difficult particularly if detection on visual examination is to be avoided. The use of a transparent overlay also restricts such manipulation. Clearly however thermosetting resins, or similar non-softenable materials which are well-known in the art, may be used so that once the resin or the like is set by curing using heat or chemical action no change is possible without damage to the layer.

It will also be apparent to those skilled in the art that the coating speeds and information density depend in part on the rheology of the coating materials and that bit densities as low as 25 flux changes per inch or hgher than 70 changes per inch are feasible with suitable formulations of coating materials. Higher coatings, which are desirable for large scale production are also attainable.

The techniques described above provide for the production of security materials and documents in which permanent visible and magnetic security features are combined and are not alterable without noticably damaging the material. Clearly other ways of bringing about the selective break through of one coating to the remote surface of another can be devised, as will be apparent to those skilled in the art.

A security document including the security feature of permanent recording of information provided by the pigment breakthrough pattern and the related magnetic structure can be used in ways that will be readily apparent to those in the art. The security document can be a pass-card or key, identity document or pass port, a valuable paper such as a cheque or currency note. The security feature can include information by which the authenticity of the document can be checked. Erasably recorded information may also be carried by the magnetisable material. Such usage and checking are well-known in the art and other suitable techniques for the security feature described above will be readily apparent.

What I claim is:

1. A security document including on a support a security feature layer formed by two overlaid coatings of differently pigmented materials of different magnetic susceptibility, the coating including the material of higher susceptibility breaking through the other coating to an outward surface thereof and at distinct fixed positions in the layer to form a pattern of the pigments one against the other, the material of higher susceptibility also forming a pattern of magnetizability variation in a layer region adjacent said outward surface of the pattern corresponding to said pattern of pigments, the fixed positions of the patterns providing the security feature.

2. A document according to claim 1 in which the pigments are visibly distinct to the unaided eye.

3. A document according to claim 1 in which the higher susceptibility material is magnetically anisotropic and is aligned to a selected direction in the parts of the pattern where the concentration is higher.

4. A document according to claim 3 in which the higher susceptibility material is aligned to a direction other than said selected direction where it does not break through to the outward surface.

5. A document according to claim 1 in which the pattern is formed by at least one of symbols, shapes, alpha-numeric characters and graphic forms.

6. A document according to claim 1 in which the pattern represents information by the distribution of pattern elements along an information axis.

7. A document according to claim 6 in which the pattern is a bar code at an information density including the range 40 to 70 flux changes per inch of track.

8. A document according to claim 1 including said patterned layer as a security feature carrying permanently recorded information and also including an erasable information record for revisable information linked with and verifiable by the permanently recorded information.

9. A document according to claim 1 in which at least one pigment is not normally visible to the unaided eye but becomes visible when a specific radiation is incident thereon.

* * * * *